Patented June 29, 1943

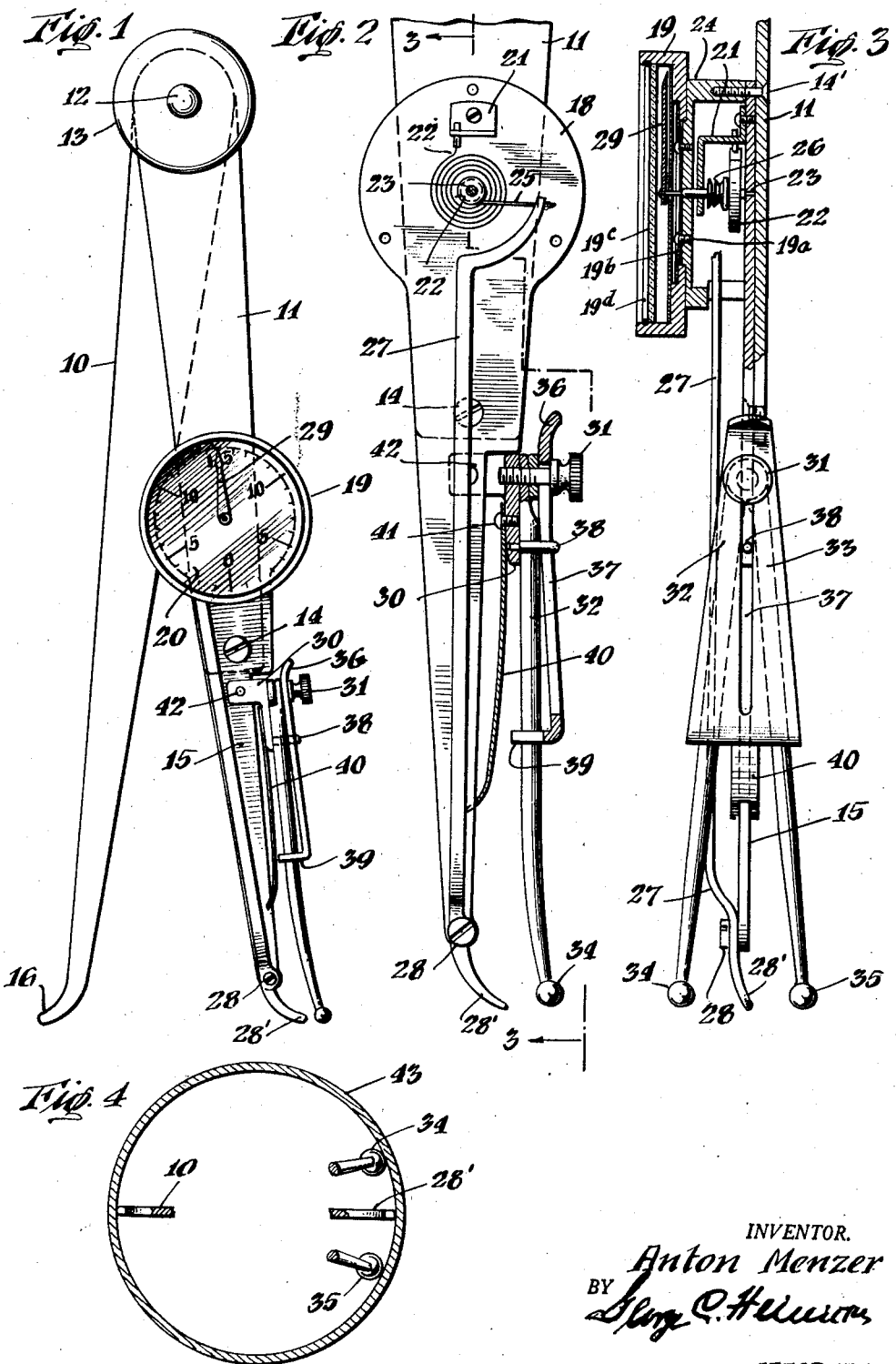

2,322,951

UNITED STATES PATENT OFFICE 2,322,951

UNIVERSAL MEASURING INDICATOR

Anton Menzer, Brooklyn, N. Y.

Application December 30, 1941, Serial No. 424,853

4 Claims. (Cl. 33—178)

My invention relates to improvements in measuring instruments, particularly calipers for measuring tubular articles, such as pipes, the bores of guns, etc., from the inside as well as from the outside, thus avoiding the necessity of having to use two instruments as heretofore, as my instrument can be used for both purposes.

The principal object of my invention is to provide a caliper equipped with means to accurately center the instrument, and with means enabling the operator to verify at a glance the exact measurements found from a dial and hand moving thereover, accurately to within one thousandth of a given scale.

The usual caliper has two legs only which in some cases have a graduated arc or the like attached thereto registering the distance between the points of the legs. However, owing to the inability to exactly center the instruments, the results shown are not accurate enough and cause errors which in cases where great accuracy of the measurements are imperative, as for instance in measuring the bores of pieces of ordnance, are extremely pernicious.

These advantages are entirely obviated or overcome by the caliper constructed according to my invention by providing the instrument with means to accurately center the instrument, and with means to lock the parts in their once determined position.

My caliper is therefore also well adapted for calibrating purposes, i. e., for the determination of the relative accuracy between a standard unit, and the work-pieces at hand.

With these ends in view my caliper comprises an auxiliary member equipped with yieldingly supported shorter legs on its side, the distance between which can be suitably adjusted by means of a slide member and the legs can be locked in their respective adjusted positions, while the results can be readily read off a dial and its hand which is then automatically returned to zero position after each operation by a simple mechanism on the auxiliary member. The indicator could also be used by itself for any kind of layout or mechanical work.

Another object of my invention is to provide a caliper of comparatively simple and therefore inexpensive construction, yet durable and highly efficient in operation.

These and other objects and advantages of my invention will become more fully known as the description thereof proceeds and will then be specifically defined in the appended claims.

In the accompanying drawing forming a material part of this disclosure:

Fig. 1 is a front elevation of the instrument constructed according to my invention.

Fig. 2 is a fragmentary, sectional view of the instrument with the dial casing removed.

Fig. 3 is a sectional side view thereof with the dial casing in place, the section being taken on line 3—3 of Fig. 2.

Fig. 4 shows a tubular body in section with fragments of the calibrator members therein.

As illustrated, the caliper or calibrator instrument is composed of the legs 10 and 11 pivotally connected at their upper ends by a suitable pin 12 carrying a locking disc 13 or the like for regulating the frictional engagement between the legs at this point. The leg 11 is shorter than the leg 10 and has pivotally secured thereto near its lower end by means of the screws 14 and 14' or the like, an auxiliary member 15. The end of leg 10 and a lever 27 constituting a prolongation of leg 11 are formed with outwardly extending feet 16 and 28' respectively, however, if desired, other forms of points may be used.

The auxiliary member 15 has formed therewith at is upper end a substantially circular plate, designated 18 to which a housing 19 for a dial 20 is attached in a suitable manner.

Plate 18 carries within the housing 19 a bracket 21 or the like to which one end of a spiral spring 22 is secured, the other end of which is attached to a spindle 23 within a housing 24. A string 25 or the like is wound about a threaded portion 26 of the spindle and has one end secured to said spindle while its other end is attached to the curved upper end of a lever 27 pivotally secured near its lower end to the auxiliary member 15, as at 28. This lever has a curved foot part 28' made integrally therewith. The rotatably mounted spindle 23 extends with its front part into the housing 19 and carries above the dial 20 therein a hand 29.

To the side edge of the auxiliary member 15 is movably secured a bracket 30 at one of its branches into which extends the shaft of a set screw 31 to hold the upper ends of shorter legs 32, 33 to said bracket and the lower ends of these legs preferably are formed to balls 34, 35. A substantially triangular sliding member 36 is suspended at its upper end from the shaft of the screw 31. This member is longitudinally slotted, as at 37, and a pin or stud 38 of the depending branch of the bracket 30 extends into said slot. The legs 32, 33 are passed through openings in an inwardly directed angular flange 39 at the lower end of the slide member 36, and a leaf spring 40 is engaged with its lower end in the member 15 and at its upper end is held by a screw 41 or the like to one branch of the bracket 30 the other branch of which turns about the pin 42.

In Figure 4, I have shown a section through a cylindrical body 43 or the like, and in operation or use of the instrument, the ends of the shorter legs 32, 33 are engaged with the inner wall of body 43 with the end of leg 10 diametrically oppositely arranged. The centering of the instrument is effected by centralizing legs 32 and 33 by means of lever 27 and its foot part 28' placing them to the center. The proper adjustment of the distance between the feet of the shorter legs by means of the slide 36 to suit different sizes of bores is effected by moving the slide 36 up or down, whereafter the parts are locked in their adjusted position relatively to one another by means of the set screw 31. If now the lever 27 is turned about its pivot 28, spindle 23 will rotate and the hand 29 will indicate on the dial the exact and accurate result of the measuring operation. The operation of the lever 27 will tension the spring 22 and its connection with the thread 29 will automatically return the hand to its original, zero indicating position.

The auxiliary member 15 is formed on its upper end into a substantially circular plate, designated 18 to which the housing 24 is secured.

On the housing 24 a rotatable dial plate housing 19 is secured by means of the screws 19ª and a spring plate 19ᵇ allowing the housing 19 to turn freely while housing 19 is still held to the housing 24. The glass cover 19ᶜ is held in place by means of a snap ring 19ᵈ.

It will be understood that I have described and shown the preferred form of my invention as one example only of the many possible ways to practically construct the same, and that I may make such changes in the general arrangement and in the construction of the minor details thereof as come within the scope of the appended claims without departure from the spirit of my invention and the principles involved.

Having thus described my invention, what I claim as new and desire to secure by Letters Patent is:

1. A caliper as described comprising a substantially long and a short leg pivoted to each other, an auxiliary member pivotally secured to said shorter leg, shorter legs laterally attached to said member, means to spread said shorter legs to conform them to the outer and inner dimensions of a tubular body, means to lock the parts in their respective positions, and a means to automatically indicate the measurements.

2. A caliper as described comprising two legs pivoted to each other, one shorter than the other, a member pivotally attached to the shorter leg, a pair of still shorter legs laterally disposed to said member, a bracket movably attached to said member, and a set screw from the shaft of which said shorter legs are suspended and held in place by said set screw, means to adjust the distance between the ends of said shorter legs, means to lock the parts in their relative adjusted positions, and means to automatically indicate the measurements found after centering the instrument in and about a tubular body.

3. In a universal measuring instrument as described, a pair of legs pivoted to each other, one shorter than the other, a member attached to the shorter leg, and a substantially circular plate forming a part of said member, a bracket on said plate, a spindle journaled in said bracket having its front end projecting therefrom, a spring secured at one end to said bracket and with its other end secured to a threaded portion of said spindle, a lever pivoted to said member near its lower end having a curved foot part, a thread attached to the end of said lever and to said spindle to wind about the threaded portion thereof.

4. A universal measuring instrument including a pair of pivotally connected legs as described and comprising a dial, a housing therefor, a member to which said housing is attached, and which in turn is attached to one of the legs of the instrument, a lever pivoted to said member, a hand moving over said dial, a rotatable spindle carrying said hand to indicate the measurements of a circular body by the displacement of said lever, centering means adapted to be locked in position relatively to a body to be measured by the proper operation of said lever co-operating with one of the instrument legs, said centering means comprising auxiliary, shorter legs associated with said member by the intermediary of a bracket movably attached thereto, a slide member guiding said shorter legs to adjust the same for their engagement with the walls of the body to be measured, means to lock the parts in their relative adjusted positions, and means to suitably cushion said centering means relatively to said member.

ANTON MENZER.